US007092495B2

(12) United States Patent
Kraft et al.

(10) Patent No.: US 7,092,495 B2
(45) Date of Patent: Aug. 15, 2006

(54) COMMUNICATION TERMINAL

(75) Inventors: Christian Kraft, Hvidovre (DK); Eeva Huusko, Oulu (FI); Johanna Jarnstom, Turku (FI); Harri Wikberg, Helsinki (FI); Harri Kiliander, Espoo (FI); Matthew P. Turner, Twickenham (GB)

(73) Assignee: Nokia Corporation, Espoo (FI)

( * ) Notice: Subject to any disclaimer, the term of this patent is extended or adjusted under 35 U.S.C. 154(b) by 261 days.

(21) Appl. No.: 10/013,523

(22) Filed: Dec. 13, 2001

(65) Prior Publication Data

US 2003/0157970 A1   Aug. 21, 2003

(51) Int. Cl.
 *H04B 1/38* (2006.01)
(52) U.S. Cl. .................. 379/88; 379/93.17; 379/368; 379/433.07; 379/433.13; 455/412; 455/550.1; 455/566
(58) Field of Classification Search ............... 455/566, 455/412; 379/96, 93, 354, 355, 396; H04M 1/225, H04M 1/247
See application file for complete search history.

(56) References Cited

U.S. PATENT DOCUMENTS

| 5,381,461 | A |  | 1/1995 | Baals et al. |
| 5,412,713 | A |  | 5/1995 | Baals |
| 5,633,912 | A |  | 5/1997 | Tsoi |
| 5,737,394 | A |  | 4/1998 | Anderson et al. |
| 5,758,295 | A |  | 5/1998 | Ahlberg |
| 5,841,855 | A | * | 11/1998 | Davidson et al. ........... 379/396 |
| 5,852,783 | A |  | 12/1998 | Tabe |
| 5,884,185 | A |  | 3/1999 | Kim |
| 6,223,058 | B1 |  | 4/2001 | Sudo et al. |

FOREIGN PATENT DOCUMENTS

EP   0633684   1/1995

(Continued)

OTHER PUBLICATIONS

"Nokia's First Imaging Phone Marks Start of Multimedia Messaging Era", Press Release, Nov. 19, 2001, http://press.nokia.com/PR/200111/840889_5.html (2 pages) printed May 12, 2001.
Nokia 7110 User Guide, Nokia User's Guides Terms and Conditions, Jun. 7, 1998, Issue 3, Nokia Mobile Phones©1999,2000.

*Primary Examiner*—Joseph Feild
*Assistant Examiner*—Julio Perez
(74) *Attorney, Agent, or Firm*—Banner & Witcoff, Ltd.

(57) ABSTRACT

A communication terminal having a user interface, and comprising a controller unit controlling said user interface, a first and a second operation key whose operation is controlled by the controller unit, and a display. The communication terminal being capable of assuming a plurality of states in which the groups of predetermined operations that may be performed by pressing said operation key are defined by the controller unit in said plurality of states. The first operation key is dedicated by the controller unit to perform one operation from said group of operations as a default function in dependence of the state assumed by the communication terminal, and the display has a first area solely dedicated for displaying the present operation performed when pressing said first operation key. The second operation key being dedicated by the controller unit to give access to said group of operations being available in the state assumed by the communication terminal. A scroll key allowing the user to scroll between operations included in said group of actions available for said second operation key. The user selects a highlighted operation by pressing a selection key.

50 Claims, 5 Drawing Sheets

FOREIGN PATENT DOCUMENTS

| | | |
|---|---|---|
| EP | 0679003 | 10/1995 |
| EP | 0844777 | 5/1998 |
| EP | 0844778 | 5/1998 |
| EP | 0901262 | 3/1999 |
| EP | 1104151 | 5/2001 |
| GB | 2344492 | 6/2000 |

* cited by examiner

COMMUNICATION TERMINAL

BACKGROUND OF THE INVENTION

1. Field of the Invention

The invention relates to a communication terminal having a user interface.

2. Description of the Prior Art

The communication terminals, such as cellular phones, are becoming more and more advanced and include therefor more and more applications, features and operations that may be performed in different situations.

The most often raised issue for the one softkey user interface style used in e.g. Nokia 3310™ and described in EP 844.777 EP and 844.778 is the fact that the key-set is insufficient to handle rarely used operations, such as allowing implementation of conference calls and call waiting in a reasonable manner. The two-softkey user interface style used in e.g. Nokia 6210™ suffers from drawbacks in effectively browsing caused by limitations of the key-set and display. One of the key findings in usability tests for the two-softkey with a combined scroll and select key user interface style used in e.g. Nokia 7110™ was that there was no clear role division between the roller press and the left softkey. Moreover, the roller press function was not indicated at all to the user, which prevented from making it an efficient key. As a result, the users felt that they had no control over the device.

SUMMARY OF THE INVENTION

According to a first aspect of the invention there is provided a communication terminal having a user interface, and comprising a controller unit controlling the user interface, a first and a second operation key whose operation is controlled by the controller unit, and a display. The communication terminal is capable of assuming a plurality of states in which the groups of predetermined operations that may be performed by pressing the operation key are defined by the controller unit in the plurality of states. The first operation key being dedicated by the controller unit to perform one operation from the group of operations as a default function in dependence on the state assumed by the communication terminal. The display having a first area solely dedicated for displaying the present operation performed when pressing the first operation key. The second operation key being dedicated by the controller unit to give access to the group of operations being available in the state assumed by the communication terminal. A scroll key allows the user to scroll between operations included in the group of actions available for the second operation key; and a selection key allows the user to select the operation highlighted when pressed.

The communication terminal according to the invention is designed as a very modular and flexible User Interface style. This gives a lot of freedom for different products to differentiate and to optimize the User Interface for special driver features. It also allows products that need to be very small and/or cheap to remove certain elements from the User Interface style.

While navigation by means of the User Interface style in the communication terminal according to the invention is optimized for a roller key (up/down navigation is prioritized compared to left/right navigation). The User Interface style in the communication terminal according to the invention will also work with a five way cluster key (five separate keys or a three way rocker key with up/down/select and back and forward on adjacent left/right keys).

Preferably, the display has a second area solely dedicated for displaying the present operation performed when pressing the second operation key. According to an alternative embodiment of the invention, the second operation key is implemented as a key having a fixed label printed thereon.

According to the preferred embodiment of the invention, the first operation key and the second operation key are implemented as two softkeys. Preferably, the communication terminal further comprising a third operation key, and the display has a third area solely dedicated for displaying the present operation performed when pressing the third operation key. The three areas solely dedicated for displaying labels presenting the operation performed by the three operation keys defines a bar across the display. The controller dynamically adapts the width of each the three solely dedicated display areas in order to optimize the intelligibility of the displayed labels for the user. The controller unit has a set of labels to be displayed for at least one of the operations performed by the three operation keys. The set of labels for one operation includes a graphical icon label and a text label. The controller unit selects whether to use the graphical icon label or the text label in dependence of what is to be displayed in the bar across the display.

According to a second aspect of the invention there is provided a method of handling a user interface in a communication terminal, and where a controller unit controls the user interface including a first and a second operation key and a display, the communication terminal being capable of assuming a plurality of states in which the groups of predetermined operations that may be performed by pressing the operation key are defined by the controller unit in the plurality of states. The method comprises dedicating the first operation key to perform one operation from the group of operations as a default function in dependence on the state assumed by the communication terminal, displaying the present operation performed when pressing the first operation key in a first area solely dedicated therefor in the display, dedicated the second operation key to give access to the group of operations being available in the state assumed by the communication terminal, allowing the user to operate a scroll key for scrolling between operations included in the group of actions available for the second operation key, and allowing the user to operate a selection key for selecting the operation highlighted.

According to a third aspect of the invention there is provided a communication terminal having a user interface, and comprising a controller unit controlling the user interface, three operation keys whose operation is controlled by the controller unit, a display. The communication terminal is capable of assuming a plurality of states in which the groups of predetermined operations that may be performed by pressing the operation keys are defined by the controller unit in the plurality of states. A first one of the three operation keys is dedicated by the controller unit to perform one operation from the group of operations as a default function in dependence of the state assumed by the communication terminal. The display has a first area solely dedicated for displaying the present operation performed when pressing the first operation key. A second one of said three operation keys being dedicated by controller unit to give access to the group of operations being available in the state assumed by the communication terminal. The user is allowed to scroll between operations included in the group of actions available for the second operation key by means of a scroll key; and to select the operation highlighted by pressing a selection key.

According to a yet further aspect of the invention there is provided a communication terminal having a user interface and comprising a controller unit controlling the user interface, three operation keys whose operation is controlled by the controller unit. The communication terminal is capable of assuming a plurality of states in which the groups of predetermined operations that may be performed by pressing the operation key are defined by the controller unit in the plurality of states. A display has three areas solely dedicated for displaying labels presenting the present operation performed by the three operation keys in the state assumed by the communication terminal which also defines a bar across the display. The controller dynamically adapts the width of each the three solely dedicated display areas in order to optimize the intelligibility of the displayed labels for the user.

BRIEF DESCRIPTION OF THE DRAWINGS

For a better understanding of the present invention and to understand how the same may be brought into effect reference will now be made, by way of example only, to accompanying drawings, in which:—

DETAILED DESCRIPTION OF THE INVENTION

Figure 1:
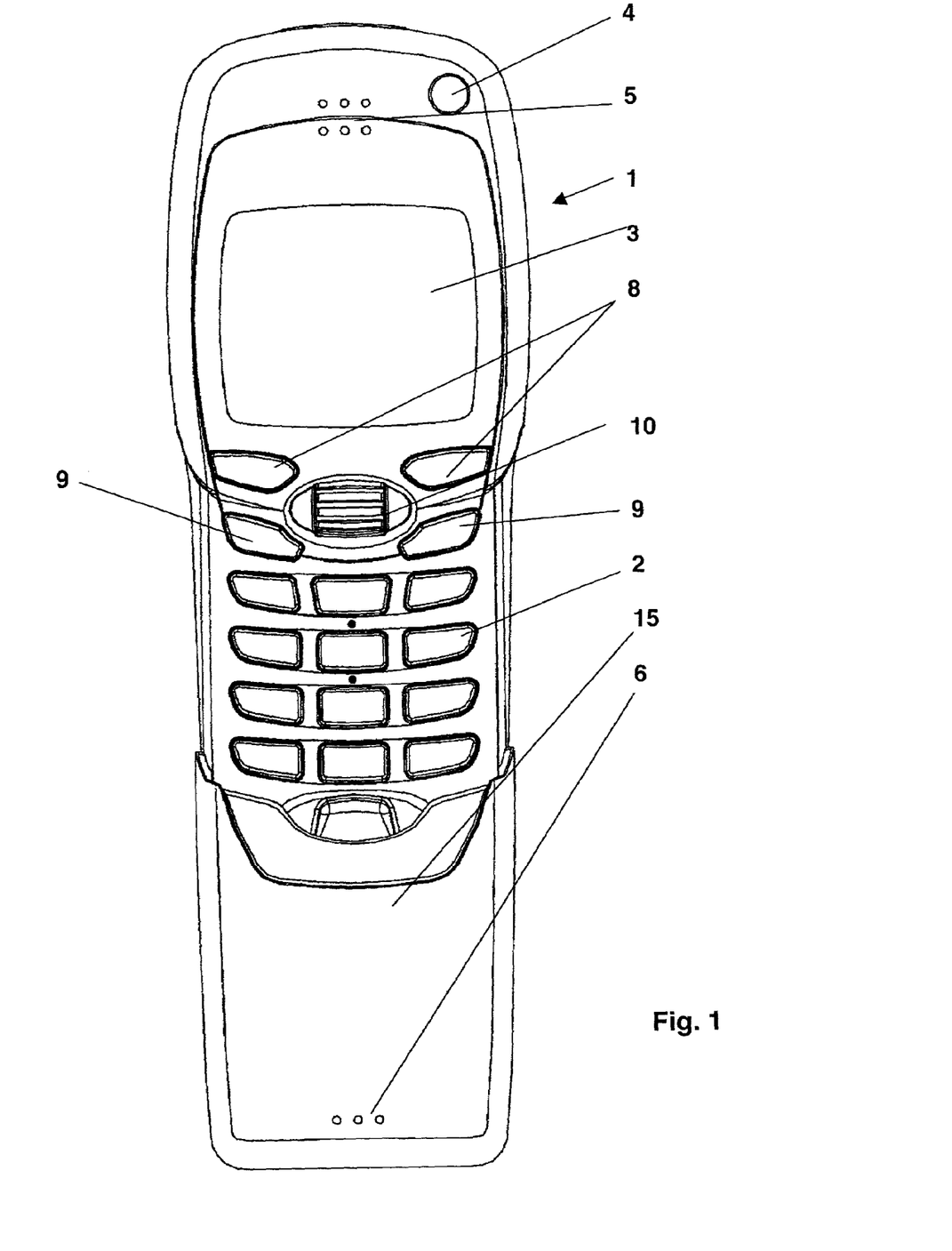
FIG. 1 schematically illustrates a preferred embodiment of a hand portable phone according to the invention.

FIG. 1 shows a preferred embodiment of a terminal according to the invention, such as a cellular phone 1, which comprises a user interface having a keypad 2, a display 3, an on/off button 4, a speaker 5 (only openings are shown), and a microphone 6 (only openings are shown) mounted in a slide 15 partly covering the keypad 2 when closed.

According to the preferred embodiment of the invention the keypad 2 has a first group 7 of keys as alphanumeric keys, two softkeys 8, and a five-way navigation roller key 10 (up/down, left/right and select) for moving a cursor. Furthermore the keypad includes two call-handling keys 9 for initiating and terminating calls. The present functionality of the softkeys 8 and the select function on the five-way navigation roller key 10 are shown in a separate field in the bottom of the display 3 just above the softkeys 8.

Figure 2:
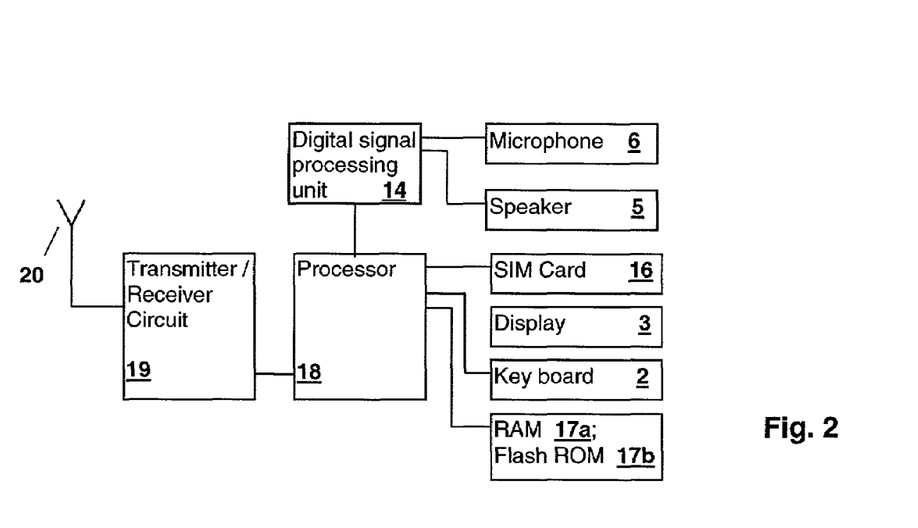
FIG. 2 schematically shows the essential parts of a telephone for communication with e.g. a cellular network.

FIG. 2 schematically shows the most important parts of a preferred embodiment of the phone, the parts being essential to the understanding of the invention. A processor 18, which supports the GSM terminal software, also controls the communication with the network via the transmitter/receiver circuit 19 and an antenna 20.

The microphone 6 transforms the user's speech into analog signals; the signals formed thereby are A/D converted in an A/D converter (not shown) before the speech is encoded in an audio part 14. The encoded speech signal is transferred to the processor 18. The processor 18 also forms the interface to a RAM memory 17a and a Flash ROM memory 17b, a SIM card 16, the display 3 and the keypad 2 (as well as data, power supply, etc.). The audio part 14 speech-decodes the signal, which is transferred from the processor 18 to the earpiece 5 via a D/A converter (not shown).

Figure 3:
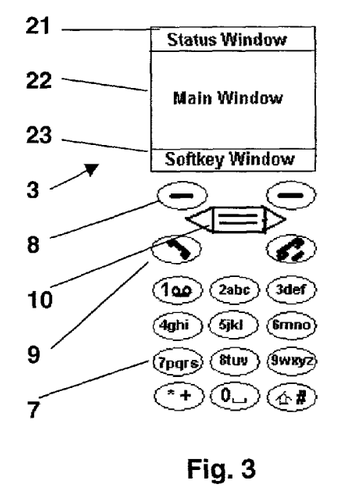
FIG. 3 shows a preferred embodiment of a user interface according to the invention.

FIG. 3 shows a preferred embodiment of a user interface according to the invention. The user interface includes the display 3 divided into three coherent areas—a status window 21, a main window 22 and a softkey window 23. The user interface shown in FIG. 3 corresponds to the phone 1 shown in FIG. 1. The functions associated with the two softkeys 8 and the "selection" function of the five-way navigation roller key 10 is displayed in the softkey window 23.

Figure 4:
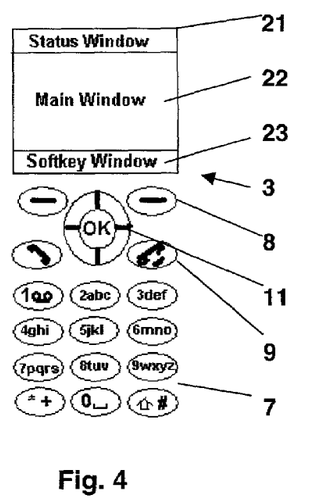
FIG. 4 shows a first alternative embodiment of a user interface according to the invention.

FIG. 4 shows a first alternative embodiment of a user interface according to the invention. The display layout in this embodiment may be the same as in the preferred embodiment. The functions associated with the two softkeys 8 and the "selection" function of the five-way navigation joystick key 11 is displayed in the softkey window 23. Such a five-way navigation joystick key 11 is known from a cellular phone Nokia 7650™ recently launched by the present assignee.

Figure 5:
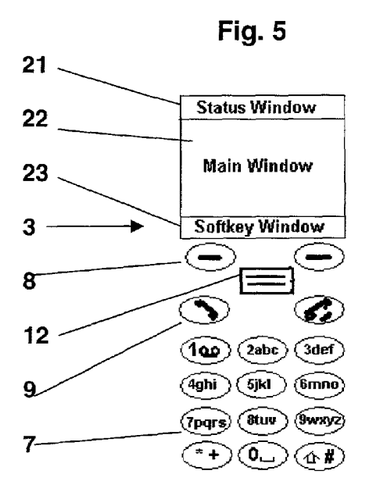
FIG. 5 shows a second alternative embodiment of a user interface according to the invention.

FIG. 5 shows a second alternative embodiment of a user interface according to the invention. The display layout in this embodiment may be the same as in the preferred embodiment. The functions associated with the two softkeys 8 and the "selection" function of a three-way navigation joystick key 12 is displayed in the softkey window 23. Such a three-way navigation roller key 12 is known from a cellular phone Nokia 7110™ launched by the present assignee.

Figure 6:
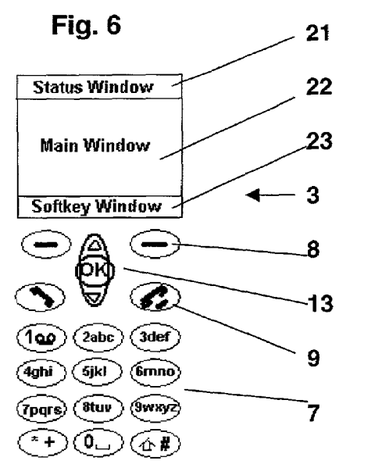
FIG. 6 shows a third alternative embodiment of a user interface according to the invention.

FIG. 6 shows a third alternative embodiment of a user interface according to the invention. The display layout in this embodiment may be the same as in the preferred embodiment. The functions associated with the two softkeys 8 and the "selection" function of a three-way navigation scroll key 13 is displayed in the softkey window 23.

Figure 8:
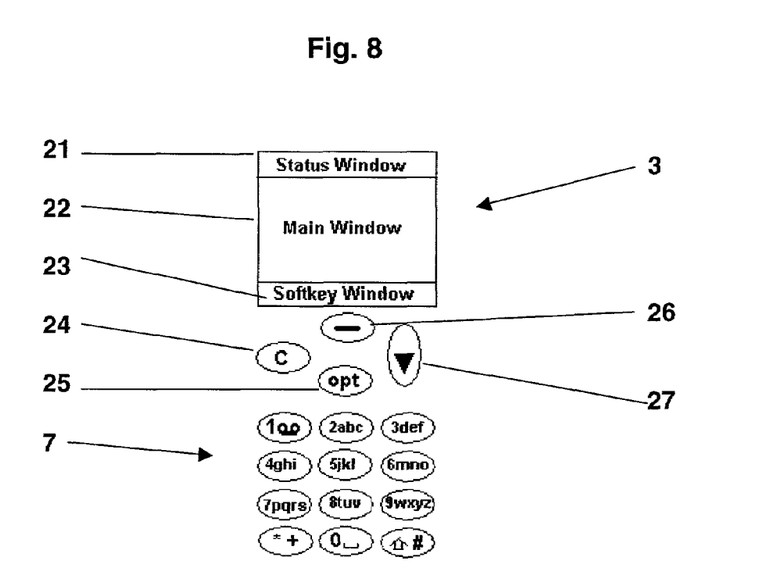
FIG. 8 shows a fourth alternative embodiment of a user interface according to the invention.

FIG. 8 shows a fourth alternative embodiment of a user interface according to the invention. The display layout in this embodiment may be the same as in the preferred embodiment. The functions associated with the single softkey 26 are displayed in the softkey window 23. The keypad includes a "clear"-key 24 performing the "negative" operations depending on the present state of the phone. These "negative" operations include rejection of incoming calls, back, exit and clear. An option key 25 gives access to an option list being displayed in the main window 22 of the display 3. A one- or two-way scroll key 27 allows the user to scroll between the options in the option list or the menu. Selections are done by means of the softkey 26.

Figure 9:
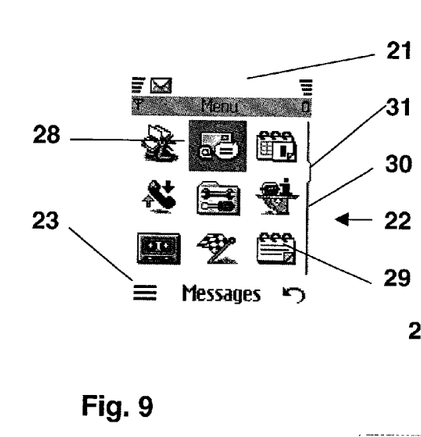
FIG. 9 shows a grid icon based display layout according to the invention.

A five-way navigation roller key 10 or a five-way navigation joystick key 11 allows the user to move a grid cursor 28 in four directions between icon cells 29 arranged in a grid structure in the display 3 as shown in FIG. 9. Preferably the grids are vertical i.e. all the cells in one line are displayed at the same time but all the lines might not fit to one screen. Scrolling to the right in the last cell of a line moves to the first cell in the next line and scrolling to the left in the first cell moves to the last cell in the previous line, respectively.

Grids loop if all the icon cells 29 can fit to one display 3. If the grid has more icon cells 29 than can be displayed on one screen, scrolling up/left in the first icon cell 29 in the first line or down/right in the last icon cell 29 in the last line is not available. This kind of navigation is useful for various applications being included in basically all cellular phones. Grid based applications may include Main menu i.e. application launchpad, Calendar (month view), and Image editing.

In these applications the four-way navigation system increases efficiency allowing the user to navigate up/down and left/right. In two-way navigation only the up/down or left/right scrolling is enabled. A possible example of how grid based applications look using the five-way navigation roller key 10 or a five-way navigation joystick key 11 is explained with reference to FIG. 9.

The grid cursor 28 is moved from one grid cursor 29 to another by means of the navigation key. A scroll bar 30 indicates the position of the selected item in relation to the length of the selection list (all the grid cursor 29). A scroll bar tab 31 descends or ascends as the user moves down and up the list.

The Main window 22 shows the area of activity (e.g. ongoing call events, menu list information, browser content etc). The content of the main window area is context dependent. Normally, the Latin characters in the Main window will be displayed in sentence case. This applies to texts such as menu texts, selection items, soft notifications, notes, confirmation queries etc. In addition to the basic font size, large fonts are provided for reading/writing in text messaging and in the phonebook for displaying numbers and names.

Figures 11, 12:
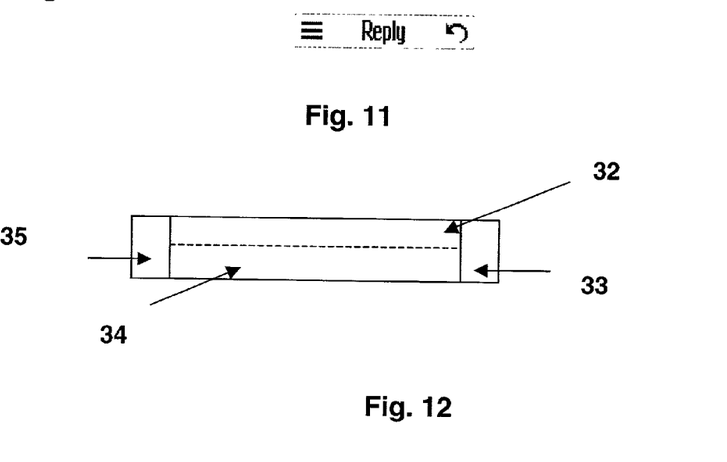
FIG. 11 shows an example of a softkey window according to the invention.
FIG. 12 shows an example of a status window according to the invention.

The softkey Window displays available softkey functions using icons or texts. In FIG. 11, the left softkey has an "Option" icon and the right softkey a "Back" icon. When an incoming call occurs, the selection key, being integrated in the five-way navigation roller key 10 or in the five-way navigation joystick key 11, activates the primary function, which here is "Reply".

When there are only two options available and neither of them can be indicated by a appropriate softkey icon, or when the softkey Window 23 has sufficient size to allow use of textual Left and Right softkeys labels, such labels are used.

FIG. 12 shows the preferred layout for a status window 21 according to the invention. A status indicator zone 32 is reserved for status indicators (e.g. SMS received, voicemail, silent mode, vibrator on, incoming call icon etc.). The digital clock is also displayed in the status indicator zone 32 in cases where the priority relationship of the status indicators allows.

A header text zone 34 in the status window is reserved for displaying header text. The user here can inspect e.g. the present level in the menu hierarchy. The Signal indicator is displayed in a signal indication window 35 in the left side of the Status window 21 and the battery indicator is displayed in a battery indication window 33 in right side of the Status window 21. Both indicators occupy the maximum height of the Status window 21.

Figure 10:
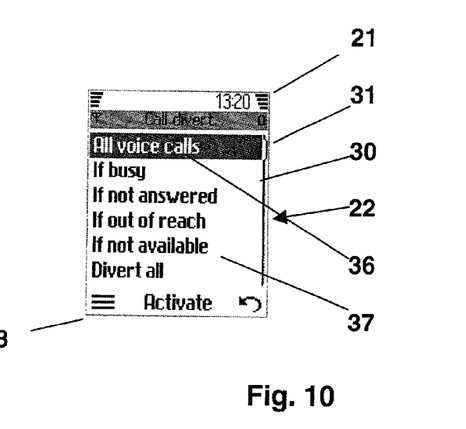
FIG. 10 shows a text line based display layout according to the invention.

Alternatively to the grid menu shown in FIG. 9, the items may be listed text-wise as shown in FIG. 10. The main menu items are displayed as a Selection list or a grid. The location in the menu tree is indicated with scroll bar 30. Animations may be applied to all menu types. The header text displays an indication of where in the menu the phone is regardless of the menu format.

The primary function of the middle softkey with label is to select the current menu item. The right softkey has the Exit/Back icon and it exits the menu to the idle state. The left softkey has an option list with personalization options and also Help, if manual help is enabled.

The header text window 34 displays the common part of the selection list, e.g. the main menu name zone. Scroll bar 30 indicates the location in the long selection list.

An option list displays options of a selection list item. Options should be ordered according to the frequency of use—starting from the most used one. Context sensitive options are preferred to the application specific ones if functions are considered of equal importance.

The basic rule is to include all the available functions to the option list in the left softkey. However, in order to keep the option list as short as possible, the functions of the other two softkeys will not be repeated in the list. Also functions having dedicated keys can be left out supposing that the functionality in the context is definitely obvious to the users. The Selection key in an option list displays "OK", if the selection of the option will activate an operation. If the selection will give new options, the Selection key displays "Select".

Figure 7:
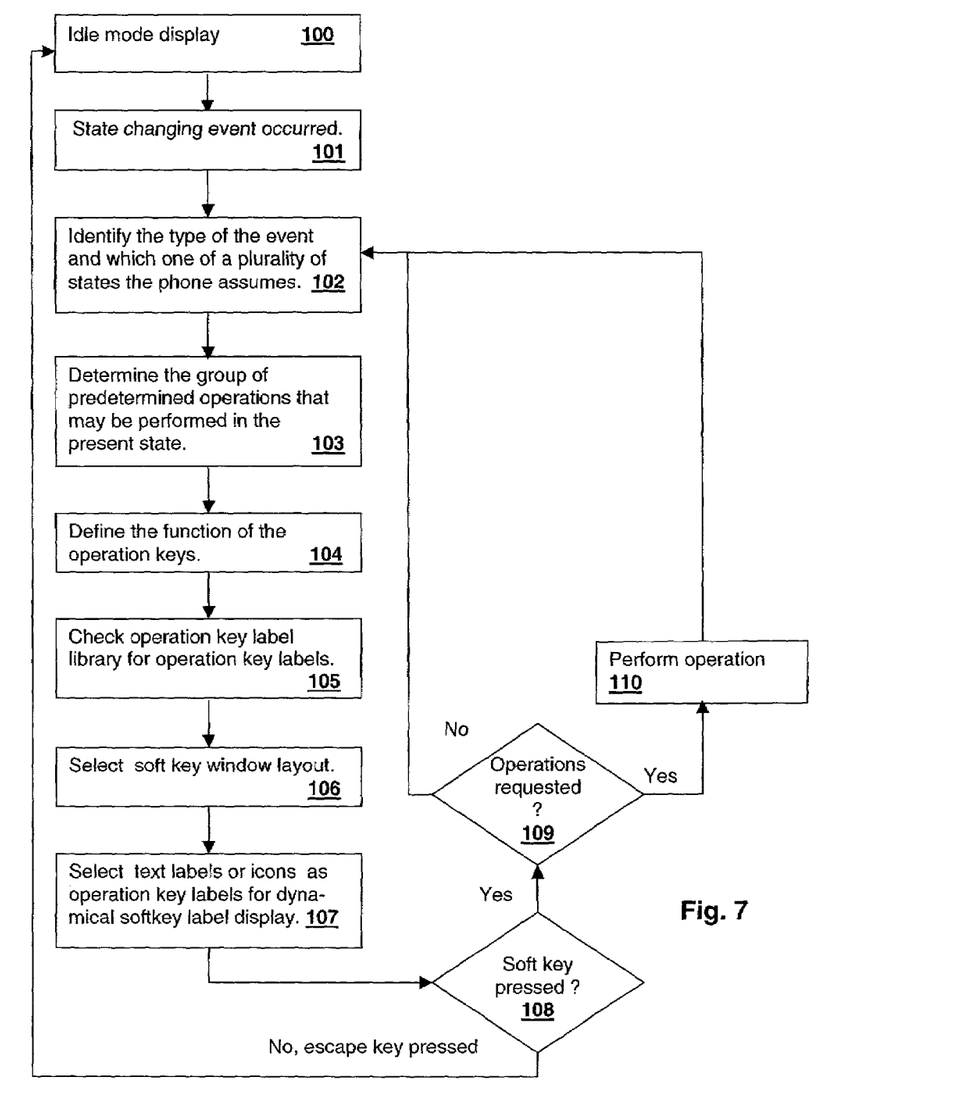
FIG. 7 shows a flow chart for the dynamic softkey label display according to a preferred embodiment of the invention.

FIG. 7 shows a flow chart for the dynamic softkey label display according to a preferred embodiment of the invention. When an event occurs in idle state the phone 1 detects the event in step 101, and identifies the event type and which options being available in the present state, and which of these to be the preferred one in step 102 and 103.

The phone 1 defines in step 104 the functions being available for the two softkey 8 and the navigation keys 10, 11, 12 or 13. In step 105 the phone checks in an operation key label library in the Flash ROM memory 17b, whether the functions to be displayed may be represented by a text label or an icon, e.g. "↶" or "Back", or "≡" or "Option". Preferably the criteria for selecting the function representation is to use text labels when the width of the softkey window allows this. A symmetrical layout and the layout with highest priority are preferred as shown in the table below.

TABLE 1

Display of icons or text for softkeys.

| Priority | Left softkey | Middle softkey | Right softkey |
|---|---|---|---|
| 1 | TEXT | TEXT | TEXT |
| 2 | TEXT | ICON | TEXT |
| 3 | ICON | TEXT | ICON |
| 4 | ICON | ICON | ICON |

The softkey window 23 is then displayed in step 107. If a softkey is pressed in the 108, it is investigated in step 109 whether an operation is requested. If so, the operation is performed and the phone goes back to step 102 for defining a new softkey window 23. If no operation is requested the phone just go back to step 102 for defining a new softkey window 23. If an escape key is pressed, e.g. an alphanumeric key is pressed in step 108; the phone goes back to idle state.

The User-interface style according to the preferred embodiment of the invention is based on having a scroll key, a selection key, an options key and a clear/back key. The scroll key is preferably able to scroll up and down, and for some purposes also able to scroll left and right.

The User-Interface style according to the invention has become more scaleable, and it allows easy addition of features to all variants at the same time. This is illustrated by the user interfaces shown in FIGS. 3, 4, 5, 6 and 8.

The User-Interface style according to the invention based on icon-text-icon concept, where the textual softkey is referred as a generic selection key. With the core keys mentioned above, this three-softkey concept according to the preferred embodiment has been created to solve the problems reported in the previous UI styles.

The user interface style according to the preferred embodiment of the invention is intended to emphasize the graphical content of the phone user interface. Certain user interface elements have been improved to reflect this switch in the emphasis.

The full implementation of the user interface style according to the preferred embodiment of the invention is based on a four-way scroll with a context sensitive selection key. The navigation mechanics are product dependent supporting the selection key implementation as a separate hard key.

The large display gives a better possibility to prevent the information of becoming fragmented, which will support the phone usability e.g. in menu navigation. Furthermore, it empowers the development of advanced applications with a request to display third party contents. It also supports customization of font sizes.

Operation Keys

As the micro browser and the service contents are the main features of WAP phones, the control device has to offer sufficient ease of navigation. The core key set composed of Up/Down scrolling keys, Selection key, Options key and Clear/Back key added with Left/Right scrolling enables slick browsing and the development of advanced applications for messaging, calendar applications, improved editing and data entry etc.

Easy and effective Browsing is one of the key applications for the user interface style according to the preferred embodiment of the invention. This user interface style contains all the required navigation keys for good and effective browsing, as well as the display (especially the larger variants) will allow considerable amount of browser contents to be displayed at the same time.

The user interface according to the preferred embodiment of the invention allows improved editing by having the primary option in the context sensitive Selection key ("Send") and giving other Options on the left softkey. Equipped with a four-way navigation key, the user interface according to the preferred embodiment of the invention eases writing and editing of text messages, calendar notes etc. Horizontal and vertical scrolling on displays gives quick access to each character in the text and also when picking characters e.g. from the separate character screens.

Grid-Based Applications

There are three kinds of grid based applications:
Main menu i.e. application launchpad
Calendar (month view)
Image editing Launchpad and image editing items are displayed in 3×3 grid. Calendar uses 7×6 grid.

In these applications the 4-way navigation system increases efficiency allowing the user to navigate up/down and left/right. In two-way navigation only the up/down scrolling is enabled.

Since the User Interface according to the preferred embodiment of the invention has a dedicated softkey for presenting the primary function, i.e. the Selection key, the left softkey can be used for "Options" in certain applications. The functionality of all features should be optimised for one hand use.

Softkeys

The User interface according to the preferred embodiment of the invention style introduces a generic Selection key implemented as cluster or separate hard key. The basic rule is to have icons in the left and right softkeys and text in the middle referring to the Selection key.

The left softkey gives the option list, if applicable, and the right softkey functions as a back or exit key. The Selection key executes the primary function in the context, e.g. selects the highlighted menu item or activates a function related to it. The user should be able to use the phone as much as possible using only the scroll and Selection keys.

When a softkey provides a function, it must be labelled. There cannot be the same function available in two softkeys at the same time.

The left and right softkey functions can exceptionally be presented as text in applications where this would support efficient and intuitive usage. In that case the middle softkey must be blank with no functionality to keep the softkey area easy to read. However, icons and texts cannot represent the same function.

The need to have textual right and left softkeys will be judged case by case. Examples of acceptable exceptions are confirmation query (Yes, No) and soft notifications having two functions (Alarm clock; Stop, Snooze).

Below, a table explaining the mapping of the options in different situations (the grey example is the Text-nothing-Text exception):

| Amount of Options | | If one option is Back/Exit/Clear | | | If no option is Back/Exit/Clear |
|---|---|---|---|---|---|
| 1 option: | | | ⤾ | | Option |
| 2 options: | | Option | ⤾ | Option1 | Option2 |
| 3 options (note: Options on left SK can contain only one option) | ≡ | Option | ⤾ | ≡ | Option |
| 4 or more options: | ≡ | Option | ⤾ | ≡ | Option |

The User interface according to the preferred embodiment of the invention UI style supports four-way navigation plus a select function. Key mechanics (e.g. cluster keys) should not have significant impact on the UI navigation style as long as the principles of up/down, left/right, back/forward and select are consistent.

The Up/Down scroll capability will be used when the display shows a list of choice items.

For single row choice items, multi-selection lists and multiple row choice items in a closed loop, the initial selected item will be highlighted on the top line of the display window. If the Up scroll key is pressed, the list items will scroll down the screen one at a time. If the Down scroll key is pressed, the highlight will move down the choice items until the choice item at the bottom of the display window is highlighted.

Further presses of the Down scroll key will scroll the list items up the screen one at a time. The highlight will focus on the choice item at the bottom of the display window until the Up scroll key is pressed (or the user exits the selection list).

When navigating through the menu list structure the Selection key activates the primary function related to the currently highlighted item. The function is displayed as the third softkey.

When navigating through the menu list structure, the left and right scroll keys are inactive.

Navigating in "Grid-Based" Applications

The grids are vertical: all the cells in one line are displayed at the same time but all the lines might not fit to one screen. Scrolling to the right in the last cell of a line moves to the first cell in the next line and scrolling to the left in the first cell moves to the last cell in the previous line, respectively.

Grids loop if all the cells can fit to one display. If the grid has more cells than can be displayed on one screen, scrolling up/left in the first cell in the first line or down/right in the last cell in the last line is not available.

In grid-based applications, selecting the Scroll up key will take the user to the equivalent cell in the line above, and scrolling down to the equivalent cell in the line below.

When looping, scrolling up/down in the first/last line moves to the equivalent cell in the last/first line.

Pressing the Selection key activates the displayed primary function related to the currently highlighted item in "grid-based" applications. For example, the grid-based calendar month overview could have the "View Day" option in the Selection key providing a shortcut to display the list of notes for the highlighted day. Another example would be selecting an icon in the application launch pad. This could take the user to the menu list for that application (or main menu) item.

When the user is in an application that supports four-way movement (for instance in the calendar month overview or application launch pad) the Left and Right keys allow the user to move left and right.

When looping, scrolling left in the first cell in the grid moves to the last cell and scrolling right in the last cell moves to the first cell, respectively.

The navigation within text input/editing applications works according to the same rules as is defined for "grid-based" applications with the exceptions described in the following sub-sections. However exceptions in different editing modes are allowed (predictive editor, Japanese editing).

The Up/Down scroll keys will also be used when the user is scrolling through text during editing. If four-way scroll is enabled, scrolling up will move the user to the equivalent point in the line above, and down to the equivalent point in the line below. If there is no equivalent point, the beginning or the end of the word or the end of the line is used.

If the up and down keys are the only scrolling keys, these keys will take the user backward and forward in the same line and move to the next line in the scrolling order once they reach the line edge. Scrolling up moves the focus backward and continues from the end of the previous line and respectively scrolling down moves the focus forward and continues from the beginning of the next line.

The Selection key performs the primary function when navigating in text input/editing applications. For further details refer to the relevant application UI specifications.

The basic rule is that left/right scroll keys in input/editing move the cursor left or right. At the end/beginning of the line the cursor moves to the end/beginning of the next/previous line.

Navigating within Browser Applications

The default is to apply the basic Option list-Primary function-Back softkey concept to the browser application. The primary function should be context sensitive if possible and the right softkey should allow back stepping both in the service content and in the application. If feasible, the left and right softkeys can be used to distinguish going backward and forward when browsing.

Menu shortcuts are supported in the idle state. When the user presses the Menu softkey and a valid menu location number within the defined time period, the menu item associated with the shortcut is activated.

The <END> key will act as a "global" exit back to idle during navigation, except when browsing, where the first press of <END> will end the operation and take the user to the previous state and the second press of <END> will take the user to idle state.

During navigation, the softkeys will give the user the option to confirm an action with the Selection key (such as Save, Call etc) or reject an action with the right softkey (such as Back, Exit, Clear, etc). Option list is available in the left softkey.

When the user is navigating selection lists, the Selection key is context sensitive. This means that in menu navigation, the left softkey will be blank, if there are no other options than the primary function.

In applications that support four-way navigation, a status indicator is displayed in the Status window 21 to indicate to the users that they can use the up/down, left/right scroll keys for navigation. An example of four-way scroll status indicator is illustrated in the following calendar month view layout next to the signal bar.

The User interface according to the preferred embodiment of the invention UI display is split into three main components or windows:

a The Status window for displaying status indicators.
  The Main window 22 for displaying menu lists and application specific data.
  The softkey window 23 for displaying softkey indicators.

Status Window

The status indicator zone is reserved for status indicators (e.g. SMS received, voicemail, silent mode, vibrator on, in coming call icon etc.). The digital clock is also displayed in the status indicator zone in cases where the priority relationship of the status indicators allows (refer to the relevant Status Indicators UI specification for further details).

The header text zone 34 in the status window 21 is reserved for displaying header text. The Signal indicator 35 is displayed in the left part of the Status window 21 and the battery indicator 33 is displayed in the right part. Both indicators occupy the maximum height of the Status window 21. The Status window 21 will be displayed whenever possible to allow the user to inspect the indication of the battery power and signal strength.

Header text information is displayed in the status window 21 when the user is navigating through the menu structure, to indicate to the user the selected menu item. The user is not able to interact with any information in the Header text (for instance he cannot select Header text). In some applications (e.g. detailed memory view in Phonebook, week list in Calendar), the zone reserved for displaying header text will also be used for application specific data.

Main Window

The Main window 22 shows the area of activity (e.g. ongoing call events, menu list information, browser content etc). The content of the main window 22 area is context dependent. The Latin characters in the Main window 22 will be displayed in sentence case. This applies to texts such as menu texts, selection items, soft notifications, notes, confirmation queries etc. In addition to the basic font size, large fonts are provided for reading/writing in text messaging and in the phonebook for displaying numbers and names.

Softkey Window

The softkey window 23 displays available softkey functions using icons or texts. The softkey window 23 has three areas solely dedicated for displaying labels presenting the present operation performed by the three operation keys in the state assumed by the communication terminal, and these three areas defines a bar across the display. The controller dynamically adapts the width of each the three solely dedicated display areas in order to optimize the intelligibility of the displayed labels for the user.

Menu Architecture

The menu architecture consists of main menu and sub menu items and option lists available for them.

The main menu items are displayed as a Selection list or a grid. The location in the menu tree is indicated with scroll bar. Animations may be applied to all menu types. The header text displays Menu regardless of the menu format. The primary function provided by the middle softkey with label selects the current menu item. The right softkey has the Exit/Back icon and it exits the menu to the idle state.

Submenus are displayed as selection lists of choice items. The choice item type depends on the product specific display layouts. If setting items compose the submenus, multiple row choice items or full window setting choice items are used. The default Selection key function in selection lists of setting items is "Change" and in other items "Select". The left softkey has an option list with personalization options and also Help, if manual help is enabled. The header text displays the common part of the selection list, e.g. the main menu name. Scroll bar indicates the location in the long selection list.

Option Lists

An option list displays options of a selection list item. Options should be ordered according to the frequency of use—starting from the most used option in the top of the list. Context sensitive options are preferred to the application specific ones if functions are considered of equal importance. The basic rule is to include all the available functions to the option list in the left softkey. However, in order to keep the option list as short as possible, the functions of the other two softkeys will preferably not be repeated in the list. Also functions having dedicated keys can be left out supposing that the functionality in the context is definitely obvious to the users.

The Selection key in an option list displays "OK", if the selection of the option will activate an operation. If the selection will give new options, the Selection key displays "Select".

For options, a maximum of two displays is recommended. Longer option lists should be shortened by adding a proper option sub-list, e.g. "Advanced options", "Others". The option sub-lists should comprise of related options, bearing in mind, however, that the commonly used items need quick access. A scroll bar indicates the location in the long option list. The header text indicates the application or function, which the options belong to.

Icons

Icons will be used to add aesthetics to the GUI and convey additional information about the feature or item they are associated with. They should be used to emphasise the textual content with which they are associated. Different types of icons will be presented in different sizes. The user interface should not be compromised with graphic icons when textual information is more relevant.

Softkey Icons

The left and right softkey functions are indicated by icons. This section presents the images of icons to be used as working assumption.

| Icon in Idle state is: | |
|---|---|
| "Names" in the right softkey |  |
| The application icons are: | |
| "Options" in the left softkey |  |
| "Back/Exit" in the right softkey |  |
| "Clear" in the right softkey |  |

Status indicators appear in the first line of the Status window 21 and can be divided into two categories: "Global" status indicators and application specific indicators.

The "Global" status indicators include items such as incoming call, silent, keyguard, and vibrator indicators, which have a priority relationship. The display of global status indicators is dependent on where in the UI the user is located and what the priority relationship is between the status indicators. Global status indicators are always displayed in idle state and during partial display and screen-saver modes.

Application specific indicators refer to indicators that may appear in specific applications (e.g. editing related indicators).

Scroll Bars

Scroll bars are used to indicate the position of the selected item relative to the length of the selection list. The scroll bar should be as narrow as possible whilst still allowing the position within the list to be clear to the user. The scroll bar tab descends or ascends as the user moves down and up the list.

The scroll bar is displayed in selection lists only when there are more items on the list than can fit on one display. When a scroll bar appears, it emphasizes to the user that there are more items available than displayed. However, there may be exceptions to this rule regarding to some applications (e.g. call lists, detailed memory view in the phonebook etc.), where there is a requirement to use the region that is defined for the Scroll window to display icons associated with the list item.

Selection Lists

Selection lists consist of choice items either shown in one or more lines. Multi-selection lists can be applied when there is need to make several selections from the same set of options. The choice items will mainly contain text, although in some cases they also contain icons (e.g. call lists). The primary icon of the choice item is located at the beginning of the text string (e.g. Phone number type icon in the Phonebook). If a secondary icon is needed, it will be located at the end of the text string (e.g. Caller group icon in the Phonebook). In some cases, the texts or numbers entered by users, e.g. names and phone numbers, may be truncated if they are too long to fit on a single line.

The whole line of the choice item selected will be highlighted. When the user scrolls through the list, the highlighting will change to indicate the currently focused choice item. When the choice items are initially displayed in the submenu and there are more items than there are rows on the display, the choice item highlighted will appear on the top line of the display window, irrespective if it is the first item in the list or not.

Multi-selection lists appear and behave in the same way as choice items. The main difference is that a check box appears to the left of the multi-selection item. When the item is highlighted the user can "mark" or "unmark" the active item. When the items are "marked" the check box is populated. Any unselected items will have an "unchecked" box next to them. The user "marks" or "unmarks" the selection list item using the Selection key. The left softkey gives the option to save enabling the user to mark and unmark a series of options and then saving all the marked options together.

Queries

Queries are displayed framed and with the query icon. Date and time queries can take advantage of four-way scrolling key: scroll up and down can be used to decrease and increase the entry and scrolling right and left to take to the next or previous data field. The Selection key accepts the entry. Confirmation queries display Yes and No options textually in the left and right softkeys. The Selection key cannot be used for confirmation.

Soft Notifications

Soft notifications are only displayed in the idle state and require the attention of the user before they are removed from the display. The text displayed may be static or dynamic. Additionally the display may incorporate an icon or animation. Soft notification text is always displayed in the main window 22 of the display. It will always be visible on a single screen of the idle display; i.e. the user will not have to scroll through the text. Following the style the most often used function related to the soft notification is displayed in the Selection key and the other options are available in the options list. However, if there are only two options available, the options list is not needed.

Notes

Note informs the user about current state in operations without requiring any user action. It is displayed in main window 22 with a related note icon and animation if needed. Confirmation notes are used to confirm the user actions if there is no other indication about the accomplished operation. If a wait note has an option to interrupt the ongoing action, the option is displayed in the selection key and the right softkey is empty. Context sensitive notes are preferred to general ones.

Soft Indicators

Soft indicators are intended to inform the user of phone status. If the user is performing any action involving pressing the keys, scrolling through the display, etc, then the soft indicator will be hidden behind the active application until activity ceases and the display returns to idle. Soft indicators may be displayed with associated graphics within the main window 22. If more than one soft indicator is used at any one time, they are displayed according to their relative priorities.

Idle State

After powering on the phone, "wake up" animation is displayed, and the phone goes to an idle state. The idle state display comprises of a Status window 21, a Main window 22 and a softkey window 23.

The status window 21 will show status icons, user definable analogue/digital clock, and also signal and battery strength indicators.

The main window 22 will show operator logo and/or name, possible network information and profile name.

The phone full menu is in the middle and the phonebook is in the right. The phonebook will display only the list of names giving the related options in the left softkey.

The idle state options are the most used ones. These options may comprise:
1. Bookmarks
2. Write message
3. Activate divert all voice calls
4. Set alarm
5. Calendar
6. Calculator

What is claimed is:

1. A communication terminal including a user interface comprising:
   a controller controlling said user interface;
   three multi-operational keys whose operation is controlled by the controller unit;
   a display including areas dedicated for displaying present operations performed when pressing the three multi-operational keys; and wherein
   the communication terminal assumes a plurality of states in which groups of predetermined operations that may be performed by pressing the operation keys are defined by the controller in the plurality of states;
   a first one of the three multi-operation keys is dedicated by the controller unit to perform one operation from the group of operations as a default function in dependence on a state assumed by the communication terminal;
   a second one of the three multi-operation keys is dedicated by the controller unit to give access to the group of operations available in a state assumed by the communication terminal; and
   a third one of the three multi-operation keys is dedicated by the controller to give access to negative and backward going actions.

2. A communication terminal having a user interface according to claim 1, comprising:
   a scroll key allowing the user to scroll between operations included in the group of actions available for the second operation key; and
   a selecting key for selection of a highlighted operation when pressed.

3. A communication terminal according to claim 2, wherein the second of the three multi-operation keys is implemented in a combined scroll and selection key.

4. A communication terminal according to claim 3, wherein the second of the three multi-operation keys is placed as a middle one of the three softkeys.

5. A communication terminal according to claim 3, wherein the first of the three multi-operation keys is placed as a left one of the three softkeys.

6. A communication terminal according to claim 3, wherein the third of the three multi-operation keys is placed as a right one of the three softkeys.

7. A communication terminal according to claims 1, wherein the controller dynamically adapts a width of each of the dedicated display areas to optimize an intelligibility of displayed labels for a user.

8. A communication terminal according to claims 7, wherein the controller causes a set of labels to be displayed for at least one of the operations performed by the three operation keys.

9. A communication terminal according to claim 8, wherein the set of labels for one operation includes a graphical icon label and a text label.

10. A communication terminal according to claim 9, wherein the controller selects whether to use the graphical icon label or the text label in dependence of what to be displayed in a bar across the display.

11. A user interface for a handheld terminal comprising:
a controller controlling the user interface;
three multi-operational keys whose operation is controlled by the controller;
a display including areas dedicated for displaying present operations performed when pressing the three multi-operational keys; and wherein
the communication terminal assumes a plurality of states in which groups of predetermined operations that may be performed by pressing the operation keys are defined by the controller in the plurality of states;
a first one of the three multi-operation keys is dedicated by the controller to perform one operation from the group of operations as a default function in dependence on a state assumed by the communication terminal;
a second one of the three multi-operation keys is dedicated by the controller to give access to the group of operations available in a state assumed by the communication terminal; and
a third one of the three multi-operation keys is dedicated by the controller to give access to negative and backward going actions.

12. A user interface in according with claim 11 comprising:
a scroll key allowing the user to scroll between operation included in the group of actions available for the second operation key; and
a selecting key for selection a highlighted operation when pressed.

13. A user interface in according with claim 12 wherein the second of the three multi-operation keys is implemented in a combined scroll and selection key.

14. A user interface in accordance with claim 13 wherein the second of the three multi-operation keys is placed as a middle one of the three softkeys.

15. A communication terminal according to claim 13, wherein the first of the three multi-operation keys is placed as a left one of the three softkeys.

16. A communication terminal according to claim 13, wherein the third of the three multi-operation keys is placed as a right one of the three softkeys.

17. A method of operating a user interface in a communication terminal including a controller controlling the user interface, three multi-operation keys whose operation is controlled by the controller and a display including areas dedicated for displaying a present operation performed when pressing the three multi-operation keys comprising:
the terminal assumes a plurality of states in which groups of predetermined operations that may be performed by pressing the multi-operation keys are defined by the controller in the plurality of states;
a first one of the three multi-operation keys is dedicated by the controller to perform one operation from the group of operations as a default function independence on a state assumed by the communication terminal;
a second one of the three multi-operation keys is dedicated by the controller to give access to the group of operations is available in a state assumed by the communication terminal; and
a third one of the three multi-operation keys is dedicated by the controller to give access to negative and backward going actions.

18. A method according to claim 17 comprising:
a scroll key allowing the user to scroll between operations included in the group of actions available for the second operation key; and
a selection key of selection a highlighted operation when pressed.

19. A method according to claim 18, wherein the second of the three multi-operation keys is implemented in a combined scroll and selection key.

20. A method according to claim 19, wherein the second of the three multi-operation keys is placed in a middle of the three softkeys.

21. A method according to claim 19, wherein the first of the three multi-operation keys is placed as a left one of the three softkeys.

22. A method according to claim 19, wherein the third of the three multi-operation keys is placed as a right one of the three softkeys.

23. A communication terminal having a user interface comprising:
a controller controlling the user interface;
three multi-operation keys whose operation is controlled by the controller;
a display; and wherein
the communication terminal is capable of assuming a plurality of states in which groups of predetermined operations that my be performed by pressing the multi-operation keys are defined by the controller in the plurality of states;
a first one of the three multi-operation keys is dedicated by the controller to perform one operation from the group of operations as a default function in dependence of a state assumed by the communication terminal;
the display has an area solely dedicated for displaying a present operation performed when pressing the first one of the three multi-operation keys;
a second one of the three multi-operation key is dedicated by the controller to give access to the group of operations available in a state assumed by the communication terminal;
a third one of the three multi-operation keys is dedicated by the controller to give access to negative and backward going actions; and
the second and third of the three multi-operation keys are implemented as hard keys having respective fixed labels printed thereon.

24. A communication terminal having a user interface according to claim 23, and comprising a
a scroll key allowing the user to scroll between operations included in the group of actions available for the second operation key and;
a selecting key for selection the highlighted operation when pressed.

25. A communication terminal according to claim 24, wherein, the second of the three multi-operation keys is implemented in a combined scroll and selection key.

26. A communication terminal according to claim 25, wherein the second of the three multi-operation keys is placed centrally below the display as the sole softkey.

27. A communication terminal having a user interface comprising:
- a controller controlling the user interface;
- three operation keys whose operation is controlled by the controller;
- the communication terminal assumes a plurality of states in which groups of predetermined operations that may be performed by pressing the operation key are defined by the controller in the plurality of states:
- a display having three areas solely dedicated for displaying labels presenting present operations performed by the three operation keys in a state assumed by the communication terminal which also defines a bar across the display; and
- the controller dynamically adapts a width of each of the three solely dedicated display areas to optimize intelligibility of the displayed labels for a user.

28. A communication terminal according to claim 27, wherein the controller has a set labels to be displayed for at least one of the operations performed by the three operation keys.

29. A communication terminal according to claim 28, wherein the set labels for one operation include a graphical icon label and a text label.

30. A communication terminal according to claim 29, wherein the controller selects whether to use the graphical icon label or the text label in dependence of what is to be displayed in the bar across the display.

31. A program stored in a storage medium for use in a communication terminal including a user interface, a controller controlling the user interface and three multi-operation keys whose operation is controlled by the controller and a display including areas dedicated for displaying present operations performed when pressing the three multi-operation keys which when executed by the controller causes the communication terminal to perform the method comprising the steps:
- assuming a plurality of states in which groups of predetermined operations that may be performed by pressing the operation keys are defined by the controller in the plurality of states; and wherein
- a first one of the three multi-operation keys is dedicated by the controller to perform one operation from the group of operations as a default function in dependence on a state assumed by the communication terminal;
- a second one of the three multi-operation keys is dedicated by the controller unit to give access to the group of operations is available in a state assumed by the communication terminal; and
- a third one of the three multi-operation keys is dedicated by the controller to give access to negative and backward going actions.

32. A program in accordance with claim 31 wherein the terminal comprises a scroll key and a selection key and the program allows the user to scroll between operation included in the group actions available for the second operation key and selection of a highlighted operation by pressing the selection key.

33. A program in accordance with claim 32 wherein the second of the three multi-operation keys is caused by the program to be implemented in a combined scroll and selection key.

34. A program in accordance with claim 33 wherein the second of the three multi-operation keys is placed in a middle of three softkeys.

35. A program in accordance with claim 33 wherein the first of the three multi-operation keys is placed as a left one of the three softkeys.

36. A program in accordance with claim 33 wherein the third one of the three multi-operation keys is placed as a right one of the three softkeys.

37. A program in accordance with claim 31 wherein the program causes a set of labels to be displayed for at least one of the operations performed by the three operation keys.

38. A program in accordance with claim 37 wherein the program causes a set of labels to be displayed for at least one of the operations performed by the three operation keys.

39. A program in accordance with claim 38 wherein the set of labels for one operation includes a graphical icon label and text label.

40. A program in accordance with claim 38 wherein the program causes selection of whether to use the graphical icon label or the text label in dependence of what to be displayed in a bar across the display.

41. The communication terminal of claim 1, wherein the default function is user programmable.

42. The communication terminal of claim 1, wherein the default function is based on frequency of use of the one operation from the group of operations.

43. The user interface of claim 11, wherein the default function is user programmable.

44. The user interface of claim 11, wherein the default function is based on frequency of use of the one operation from the group of operations.

45. The method of claim 17, wherein the default function is user programmable.

46. The method of claim 17, wherein the default function is based on frequency of use of the one operation from the group of operations.

47. The communication terminal of claim 23, wherein the default function is user programmable.

48. The communication terminal of claim 23, wherein the default function is based on frequency of use of the one operation from the group of operations.

49. The program of claim 31, wherein the default function is user programmable.

50. The program of claim 31, wherein the default function is based on frequency of use of the one operation from the group of operations.

* * * * *